Dec. 11, 1962  D. D. ZEBLEY  3,067,860
TURNWHEEL ASSEMBLIES FOR CONVEYORS
Filed June 13, 1960  3 Sheets-Sheet 1
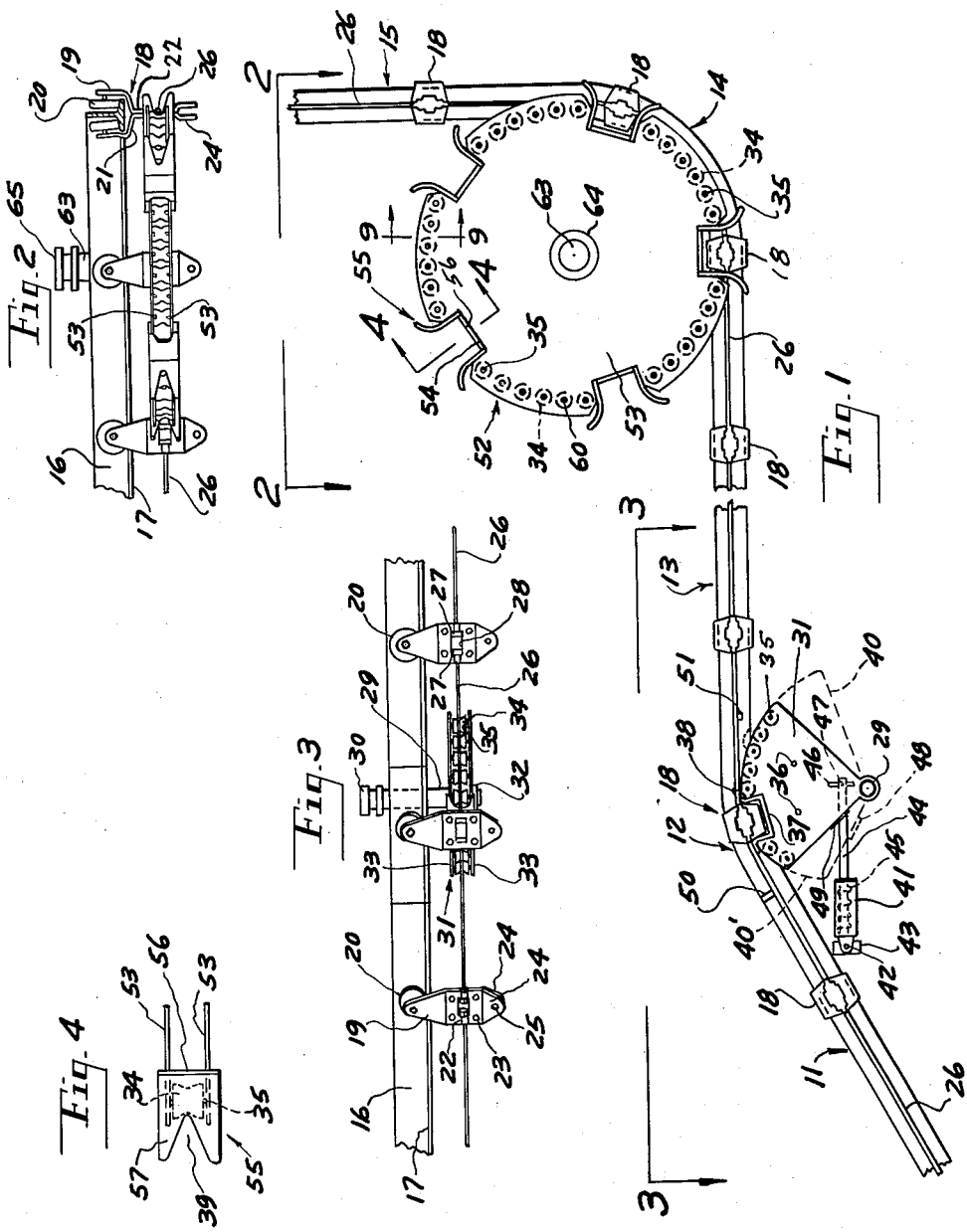
INVENTOR.
DONALD D. ZEBLEY
BY
Robert A. Sloman
ATTORNEY Dec. 11, 1962 D. D. ZEBLEY 3,067,860
TURNWHEEL ASSEMBLIES FOR CONVEYORS
Filed June 13, 1960 3 Sheets-Sheet 2

INVENTOR.
DONALD D. ZEBLEY.
BY
Robert A. Sloman
ATTORNEY

Dec. 11, 1962 D. D. ZEBLEY 3,067,860
TURNWHEEL ASSEMBLIES FOR CONVEYORS
Filed June 13, 1960 3 Sheets-Sheet 3

INVENTOR.
DONALD D. ZEBLEY
BY
Robert C. Sloman
ATTORNEY

United States Patent Office 3,067,860
Patented Dec. 11, 1962

3,067,860
TURNWHEEL ASSEMBLIES FOR CONVEYORS
Donald D. Zebley, Box 2251, Greenville, S.C.
Filed June 13, 1960, Ser. No. 35,613
6 Claims. (Cl. 198—177)

This invention relates to cable conveyors and more particularly to improved turnwheel assemblies for cable conveyors and the like.

The present application is a continuation in part of my copending patent application, Serial No. 787,864, filed January 20, 1959, which said latter application is a division of my earlier filed patent application 649,837, filed April 1, 1957, now U.S. Patent 2,869,709.

The present invention is particularly directed to improved indexing wheels or turnwheels such as are used in conveyor assemblies for assisting the conveyor mechanism as suspended from an overhead trolley support in making the desired changes in the direction of movement.

It is the primary object of the present invention to provide a new form of index wheel assembly and floating turnwheel assembly wherein the wheel consists of a pair of parallel spaced plates which may be circular in form, or form the segment of a circle, journaled upon a central radius and carrying adjacent the periphery thereof a series of guide rollers adapted to cooperatively engage not only the cable of the cable conveyor but the longitudinally spaced conveyor mechanisms connected with the cable.

It is a further object of the present invention to provide in an index wheel or a floating turnwheel or the like, one or more outwardly extending radial indentations therein in association with a series of guide rollers in peripheral portions thereof adapted to cooperatively receive the respective conveyor assemblies as longitudinally spaced upon a conveyor cable and as suspended from a suitable mounting support.

It is a further object of the present invention to provide an index wheel segment together with automatically operable means for effecting incremental arcuate repositioning movements thereof as the cable and associated conveyor elements are transported around a curved portion with respect to the track from which the conveyor assemblies are movably suspended.

It is a further object to provide a spring-loaded type of index wheel wherein rotation thereof in association with a conveyor assembly builds up tension in a coil spring to cause an automatic return of the index wheel to its initial position after disengagement of the conveyor assembly therefrom.

It is the further object of the present invention to provide a novel form of floating turnwheel carrying a series of radial outwardly opening peripheral segments in spaced relation adapted to cooperatively and adjustably receive one or more of a series of longitudinally spaced conveyor assemblies suspended from and movably mounted with respect to a supporting conveyor beam and in conjunction with a driving cable for the purpose of negotiating a change in direction of movement of the said conveyor assemblies.

It is a further object of the present invention to provide a full floating type of turnwheel assembly wherein the radial recessed portions thereof are adapted to adjustably compensate for slight variations in the spacing of the conveyor elements so as to interlockingly receive the same as they passed thereover together with means for minimizing the frictional contact of the cable with the wheel as said conveyor assemblies negotiate the predetermined change in direction.

These and other objects will be seen from the following specification and claims in conjunction with the appended drawings, in which:

FIG. 1 is a bottom plan view of a portion of a conveyor assembly showing a series of conveyors movably suspended from an overhead track with the individual conveyor assemblies joined in spaced relation to spaced portions of a drive cable or series of cable elements and in conjunction with index and turnwheel to facilitate changes in direction of movement of the assembled conveyors.

FIG. 2 is a fragmentary section taken on line 2—2 of FIG. 1 illustrating the normal suspension of a series of conveyor assemblies from the track mounting same.

FIG. 3 is a similar fragmentary section taken on line 3—3 of FIG. 1 illustrating the normal positioning of another portion of the series of assembled conveyor mechanisms.

FIG. 4 is a fragmentary section on an enlarged scale taken on line 4—4 of FIG. 1.

FIG. 5 is a plan view of another form of turnwheel incorporating a series of spring loaded floating casings.

FIG. 6 is a fragmentary section taken on line 6—6 of FIG. 5.

FIG. 7 is a fragmentary plan view of a different form of pocket arrangement for a full floating turnwheel of the type shown in FIG. 1.

FIG. 8 is a side elevational view of one of the guide rollers therefor, on an enlarged scale.

FIG. 9 is a fragmentary section taken on line 9—9 of FIG. 1, on an enlarged scale.

FIG. 10 is a fragmentary perspective view of another form of spring-loaded index wheel.

Figure 11:
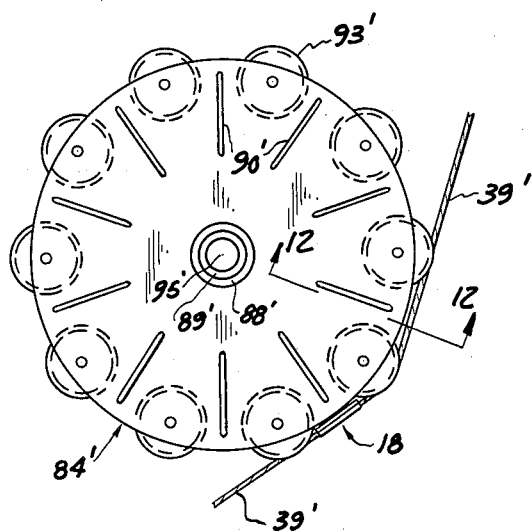
FIG. 11 is an elevational view of a floating wheel type of turn or guide for a conveyor system.

It will be understood that the above drawings illustrate merely several preferred embodiments of the invention, and that other embodiments are contemplated within the scope of the claims hereafter set forth.

Referring to the drawings, and particularly FIGS. 1, 2 and 3, FIG. 1 is in effect a bottom plan view of a conveyor assembly as it would be seen by someone looking up towards the ceiling of a building upon the interior thereof.

There is provided for the conveyor assembly a conventional type of I-beam type of track 11 which is suitably suspended from the ceiling in a conventional manner and which includes the upright web 16, FIG. 2 and the outwardly directed horizontally disposed flanges 17 over which a series of conveyor assemblies 18 are movably mounted and suspended, as particularly shown in FIGS. 2 and 3.

The conveyor assembly consists of a pair of oppositely arranged symmetrical brackets which include the upwardly extending arms 19 which journal and mount the opposed slightly angular rollers 20 which are movably mounted upon and suspended from the horizontal flanges 17 forming a part of the I-beam 11.

The respective plates forming a part of the conveyor assembly, include the inwardly directed elements 21 which terminate in the upright opposed plates 22 fixedly secured together by the fasteners 23, the said plates terminating in the parallel spaced load supporting elements 24 transversely apertured at 25.

In conjunction with the present invention, there is employed an elongated cable 26 which may be of unit form or on the other hand may consist of a series of unit lengths of cable elements such as indicated at 26 and which have carried at the ends thereof, or suitably secured, the enlargements or cylindrical formations 27. As shown particularly in FIG. 3, the opposed upright plates forming a part of the conveyor bracket have formed therethrough the transverse apertures 28 which receive portions of the cylindrical bosses 27 secured upon the respective ends of the cable elements. The respective bracket elements themselves are outwardly formed so as to cooperatively receive adjacent portions of the cable elements which project from opposite edges thereof, as best shown in FIG. 3. This provides a means not only of locking the individual cable element 26 together, but at the same time provides a means of drivingly mounting the respective conveyor assembly 18 so as to move the same over and along the supporting beam 16—17.

When the respective symmetrical plates for the conveyor assembly are brought together and secured as by the fasteners 23, the cable elements 26 and the enlargements 27 on their ends are secured and retained between the respective said plates completing the conveyor assembly.

The present invention is not directed, however, to the conveyor assembly per se, but is primarily directed to the turn-wheel or index wheel assemblies which must be employed in conveyor devices of this type whenever the conveyor seeks to negotiate a change in direction, as shown particularly in FIG. 1.

Adjacent the track 16—17, as at 12, FIG. 1, there is an initial change in direction, less than 90 degrees, and for this purpose there is provided an index guide wheel 31, which is loosely journaled, as at 32, FIG. 3, adjacent the lower end of the upright support shaft 29 which is suitably anchored at 30 to a portion of the building ceiling or associated structure. Wheel 30 is in the form of an idler constituting a guide to facilitate a change in direction of the conveyor.

The index wheel or sector 31 consists of a pair of parallel spaced plates 33, which have an arcuate outer edge adjacent to which and between which there are provided a series of spaced guide rollers 34 journaled at their opposite ends as at 35 upon the respective plates 33 and arranged therebetween so as to be engaged by the moving cable 26 forming a part of the conveyor assembly, as best illustrated in FIG. 3.

An important function of the index wheel 31 is that it must have a suitable cutout as designated by the radial cutout 37 so as to cooperatively receive a particular conveyor assembly as the same negotiates the change in direction primarily governed by a curved supporting track, as at 12.

For this purpose there are provided in the cutout 37 a pair of opposed spaced arcuate guide arms 38 whose outer portions have a substantial V-notch 39 formed therein, as best illustrated in FIG. 4, to cooperatively receive the portions of the cable 26. At the same time base portions of the arcuate members 38 receive loosely therebetween the conveyor assembly 18. The index wheel 31 is so journaled as at 32 as to be capable of moving or being driven by the said conveyor assembly 18 as the conveyor assembly is drawn through the power transmitted to the cable 26 past the index wheel 31. At the same time the index wheel will rotate in a clockwise direction to the dotted line position indicated at 40 in FIG. 1.

At this point, the conveyor assembly 18 disengages itself from the guide means 38 and engages and activates the switch 51 for the purpose of energizing and electrically operating the solenoid 41, which is swivelly mounted at 42 to the support 43. The solenoid includes a longitudinally movable core 44 and incorporates a coiled spring 45 normally maintaining the core in an inoperative position such as designated in FIG. 1.

The free end of the elongated longitudinally movable core arm 44 extends to and is pivotally connected loosely as at 47 to the index wheel 31 relative to the transverse slot 46 therein.

Accordingly, at the moment that the assembly 18 engages the contact 51, the index wheel 31 has been rotated in a clockwise direction to the dotted line position shown at 40. When the solenoid is energized, the core rod 44 is withdrawn to the left in a conventional manner causing the index wheel 31 to return to its initial inoperative dotted line position as indicated at 40′, FIG. 1. Here the index wheel is now in the correct position for receiving the succeeding conveyor assembly 18. As the said conveyor assembly to the left of the index wheel in FIG. 1 engages the switch arm 50, the solenoid 41 is deactivated with the coil spring normally holding the core 44 in an inoperative position and with the index wheel 31 in its extreme position to the left, as indicated by the dotted line 40′. Here the conveyor assembly 18 enters into the cutout or recessed guide 37—38 with adjacent portions of the cable on opposite sides of the conveyor assembly guidingly engaged by the assembled series of spaced rollers 34 arranged adjacent the periphery of the index wheel 31. Accordingly, this conveyor assembly 18 again rotates the index wheel 31 as it negotiates the turn guided by the said wheel about its radius or central axis 29 until the turnwheel again returns to the extreme right hand dotted line position 40 of FIG. 1. The process is again reversed with the said conveyor assembly 18 engaging the switch 51. At this point the conveyor assembly has become disengaged from the index wheel 31 and under the operation of the solenoid 41 the said index wheel rotates in a counterclockwise direction back to its initial position 40′ ready to receive the next conveyor assembly.

Referring further to FIG. 1, there is shown a right angular turn for the track from the direction indicated at 13 through the portion indicated at 14 and to the right angular direction as at 15. For this purpose there is provided a floating turnwheel 52 which is appropriately cutout so as to receive the longitudinally spaced conveyor assemblies 18 and the said assemblies and the connected drive cable 26 moved therearound.

The floating turnwheel generally indicated at 52, includes a pair of parallel spaced circular plates 53 having a series of equally spaced radially extending cutouts 54 within which are positioned the respective generally U-shaped outwardly extending guide members 55 further shown in FIG. 4 as including the plates 57 notched as at 39 to cooperatively receive portions of the cable 26, the said cable also being guidably engaged by the series of idle rollers 34 journaled at 35 as indicated in FIG. 3, and on an enlarged scale in FIG. 4.

The respective guides are generally U-shape as indicated at 55—56 with the free end portions 57 curved outwardly in opposition to each other so as to effectively receive and guide into the notches thereof the respective conveyor assemblies 18 as they move into the respective spaced openings. Here there is a continuously rotatable wheel 52 with hub which is suspended from the shaft 63 and retained thereon as at 64, the upper end of the shaft being suitably mounted from the building ceiling or other supporting member as at 65, FIG. 2.

Referring to FIG. 9, the guide wheel assembly 34 is shown on an enlarged scale and wherein between the plates 33 corresponding to the index wheel 31 of FIG. 3, and of course, also corresponding to the spaced plates 53 of the turn wheel 52, there are provided a series of groups of arcuately arranged spaced guide rollers 34. Each of the respective guide rollers has an Oilite bearing sleeve which projects therethrough as at 59 and which extends beyond the opposite sides of the said roller 34 for the purpose of cooperative engagement with the interior surfaces of the plates which define the wheel.

A transverse bolt 60 extends through the respective plates 33 and through the said bearing sleeve and is secured at its end by the nut 61 with suitable lockwasher 62 interposed. It is noted in FIG. 9 that the rollers 34 have an annular central groove 58 which cooperatively receives portions of the cable 26. At the same time, it is noted that there is arranged in spaced relation around the periphery of the wheel 52 the series of radial outwardly extending generally U-shaped guides 55 which are adapted to cooperatively receive the respective conveyor elements 18. These are normally oversize with respect to the width of the conveyor assemblies as there may be slight variations in the exact spacing of the conveyor elements upon the cable elements 26.

This may occur for a number of reasons, as for example, slippage, or stretching of the cable. Accordingly the respective free edges of the U-shaped guide members 55 are arcuately curved outwardly to thus guide the respective conveyor assembly into the recess of the guide member in the event that it does not initially match therewith. This assures that the conveyor assembly smoothly makes its turn from the position as at 13 through the position as at 14 to the position as at 15.

The respective longitudinally spaced conveyor assemblies 18 will normally enter into the U-shaped cavities defined within the guide means 55. The spacing normally between the arcuately spaced guide means 55 corresponds to the spacing of the conveyor elements 18 generally with respect to the cable 26. The index wheel 52 is in the nature of a floating wheel journaled idly upon the supporting upright shaft 63. Accordingly, provision is made for slight compensation in irregular spacing of the conveyor assemblies so that the said guides 55 in effect cause such additional compensating rotary movement of the turnwheel 53 that the said conveyor assemblies will in effect move around and within the respective guides 55 at the same time as adjacent portions of the cable 26 are guided and engaged by the series of spaced guide rollers 34 which are arranged between each of the respective radial outwardly extending guide means 55.

A modified form of floating turnwheel is fragmentarily illustrated in FIG. 7, corresponding to turnwheel 52, being continuously circular and including a pair of parallel spaced circular plates 66 fragmentarily shown having an idle journal support 67 corresponding to the supporting shaft 63 in FIG. 2. The floating guide wheel 66 is retained upon the said shaft 67 by a suitable mounting collar 68, FIG. 7.

There are provided adjacent the outer periphery of the guide wheel 66 the series of outwardly opening radial pockets 69. Adjacent the opposite ends of the said pockets and journaled as at 73 between the plates 66 are a pair of spaced guide rollers 72 shown on an enlarged scale in FIG. 8 and which include the internal annular grooves 74 to cooperatively receive portions of the conveyor cable 26 and to receive therebetween the conveyor assemblies 18 above described.

In the construction of the complete turnwheel 66 which is fragmentarily shown however in FIG. 7, there are a series of equally spaced radial outwardly opening cutouts 69 around the periphery of the wheel body with pairs of the said guide wheels 72 of an enlarged character journaled adjacent the edges of the cutouts 69 and extending thereinto to cooperatively guide the respective conveyor assembly into the said cutout in the event that it does not perfectly register therewith.

At the same time and due to the floating mounting at 67—68 of the said turnwheel there is effected a compensation or self-alignment of the conveyor assembly with respect thereto to facilitate the turning or change of direction of the series of conveyor elements interconnected by the cable elements 26.

The said turnwheel 66 also includes the series of smaller guide wheels 70 which are the same in construction as the guide wheels 34 of FIG. 3, the said guide wheels being journaled at their opposite ends as at 71 within and between peripheral edge portions of the plates 66 defining the said turn wheel of FIG. 7. It is noted in FIG. 7 that the said wheels are entirely within the contour of the guide wheel 66. However, the plates 66 are spaced apart and the drive cable 26, shown in FIG. 1, is adapted to cooperatively engage the respective guide wheels 70 in the same manner as above described with respect to FIGS. 1 and 3, or as further shown in FIG. 2.

The enlarged guide wheels 72, as shown in FIG. 8 have a transverse bore 74' to receive a suitable Oilite bearing sleeve for supporting and maintaining the said guide wheels with respect to and between the plates 66, defining the floating turnwheel of FIG. 7.

Another form of floating wheel is shown in FIGS. 5 and 6 wherein the turnwheel consists of a central circular plate 75 journaled and suspended upon an upright shaft 76 and retained thereon at 77 with suitable bearing means interposed so that the said disc 75 has an idle mounting and is free to rotate with respect to the support 76 in the same manner as above described in connection with FIGS. 2 and 3.

Arranged around the disc or wheel 75 are a series of spaced outwardly opening radial cutouts 78 within which are positioned and suitably secured a series of equally spaced generally U-shaped conveyor guides or receivers 80 with each of the said guides including the outwardly extending and outwardly curved guide arms 81 which have a V-shaped type of notch similar to that shown at 39 in FIG. 4 for the purpose of cooperatively receiving portions of the driving cable which interconnects the respective conveyor elements 18.

The individual guide means arranged and secured around the wheel 75 are generally designated at 79, in FIG. 5. Instead of a series of rollers in the peripheral edge portion of the guide wheel, there are substituted as shown in FIG. 5, a series of spring-loaded floating casings of general wedge-shape, designated at 82, which are of a unitary structure and at their inner ends are pivotally mounted as at 83 to the short studs 84 which are anchored through portions of the wheel plate 75. Accordingly, the respective plates 82 are free to rotate about their pivotal mountings 83. The plates 82 at their outer peripheral portions are transversely formed into an elongated arcuate boss 85, which overlies the peripheral edge portion of the plate 75 and which has in its outer surface a continuous groove 86 of V-shape in cross section adapted to cooperatively receive the cable 26.

Based between the respective plates 82 around the plate 75 are a series of pins or anchor points 87. A series of coiled springs 88 are anchored at their one ends to each of the respective pins 87 and at their opposite ends connected to intermediate edge portions of the respective plates 82, as best shown in FIG. 5 so that there is provided a yielding mounting of each of the plates 85 for normally centering the same on their pivotal mountings 83, as shown in FIG. 5. At the same time, the said plates 82 can move pivotally around the pivotal mountings 83 against the action of the respective springs 88. Also it is noted that the said plates 82 are free when disengaged from the cable to return to the centralized position shown in FIG. 5.

Here again, the free floating principle is present, because not only does the wheel plate 75 have an idle mounting upon the supporting shaft 77—76, but additionally the respective and individual cable engaging plates 82 have idle mountings by which they are pivotally mounted at their inner ends upon portions of the wheel plate 75 as at 83.

Here also, the cutouts and the guide means secured therein as at 79 have outturned end members 81 so as to cooperatively receive the conveyor elements 18. Here also should the spacing between the conveyors be not exactly equal to the ordinary spacing between the guides 79 upon the wheel 75, means for compensating for this are provided not only in the idle mounting of the wheel plate 75 but also in the fact that the curved members 81 of the guide 79 in effect guide the conveyor assemblies into the central recess of the respective guides facilitating the turning of the conveyor assembly with the associated cable around a portion of the turnwheel shown in FIG. 5.

A slightly different form of spring-loaded index wheel is designated at 89, FIG. 10, and includes a pair of spaced sectors or plates 90 and 91, each plate having a radial cutout 92 in vertical alignment adapted to cooperatively receive a conveyor assembly.

Guide means 93—94 are also provided within and extend outwardly from the cutouts 92 to cooperatively receive the respective conveyor elements. The guide members 93 are curved outwardly as at 94 as above described with respect to FIG. 5, and are also notched as 95 to cooperatively receive the cable 26.

Guide means 93—94—95 is exactly the same as above described with respect to the other index wheels or floating turn wheels.

A series of guide rollers 96 of the same construction as the roller 34 of FIG. 9 are interposed transversely between the respective plates 90—91 and journaled therebetween as at points 97 in an assembly exactly the same as above described with respect to FIGS. 3 and 9. These guide wheels are normally within the contour of the respective plates 90 and 91 and are for the purpose of cooperatively engaging portions of the cable 26.

The upright shaft 98 is suspended from the building structure and rear portions of the wheel plates 90 and 91 are journaled upon the shaft as at 99 and suitably mounted thereon. A coiled spring 100 is mounted around the shaft 98 and at one end anchored thereto at 101. The opposite end of the coil spring is anchored to a portion of the index wheel 89 as at 102. Accordingly, as the cable and associated conveyor moves it carries the indexing wheel 92 from its initial position to a position of rotated adjustment so that the spring 100 is tensioned.

At the moment that the conveyor assembly 18 disengages the guide means 93, 94, the coil spring 100 is effective to return the indexing wheel to its initial position so as to cooperatively receive the next conveyor assembly 18 in connection with the moving cable 26. Accordingly, this type of spring loaded wheel may be employed wherein there is used only a single guide means to engage all of the conveyor assemblies and with the index wheel 89 being capable of rotary movement upon or with respect to its supporting shaft 98 so that the guide means are repositioned after each usage to cooperatively receive the next succeeding conveyor assembly.

Figure 12:
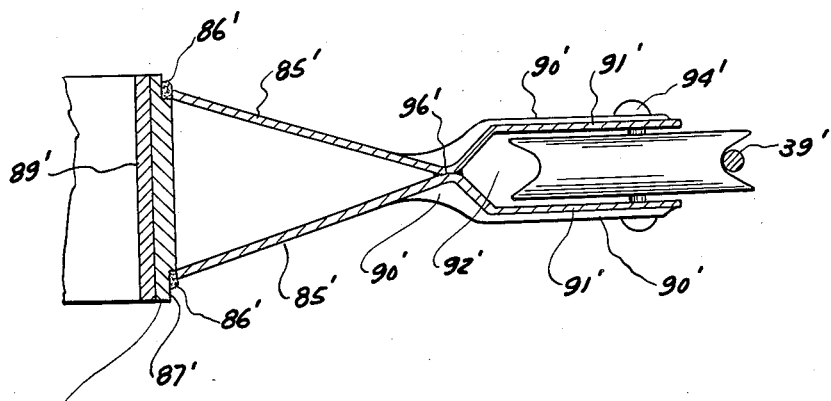
FIG. 12 is a fragmentary section taken on line 12—12 of FIG. 11, on an enlarged scale.

FIGS. 11 and 12 illustrate the turnwheel 84' over which the cable elements 39' and their associated trolley conveyor elements move in the desired direction.

Turnwheel 84' is constructed from a pair of circular centrally apertured opposed plates 85'. The inner edge portions of said plates bounding the aperture therein overlie the shoulder 87' of hub 88' and are suitably welded thereto or otherwise secured as at 86'. A suitable bushing 89' is retained within hub 88' and is journaled over the support shaft 95', FIG. 11.

Outer contacting portions of plates 85' are suitably secured together as by the welds 96'. These portions terminate in the annular parallel spaced peripheral extensions 91' which define around the wheel the annular trough or groove 92'. The peripheral plate elements 91' are reinforced by the series of radial ribs 90'. A series of pulley wheels 93' are arranged around the periphery of wheel 84' partially within the annular groove 92' and journaled and retained therein by the series of spaced rivets 94'.

A portion of each of the pulleys 93' projects beyond the periphery of the wheel assembly 84' in order to cooperatively receive portions of the cable elements 39', as shown in FIG. 11.

The centers of the pulleys 93' are so spaced as to provide an adequate clearance for the conveyor assemblies 18, which will move between the said pulleys as to the cable assembly movably extends around said turnwheel.

As all cables subject to load are capable of some yielding or stretching, the spacing between pulleys 93' is such that should there not be an exact registry of the conveyor assembly 18 between a pair of wheels then the said assembly would in effect roll into such space, being guided over the individual pulleys 93' carried by the main wheel 84'.

Accordingly the present turnwheel 84' is constructed to compensate for any slight change in length or distance between conveyor assembly centers, by spacing portions of adjacent pulleys a distance greater than the width of the conveyor assembly 18.

Having described my invention, reference should now be had to the following claims.

I claim:

1. In a trolley conveyor, a turnwheel adapted to receive a movable cable carrying a plurality of equally spaced load supporting means; said turnwheel consisting of a hub, a pair of spaced discs centrally receiving said hub, there being a plurality of transversely aligned spaced pairs of radial load support means receiving cutouts spaced apart along the outer peripheries of said discs respectively, the portions between the spaced apart cutouts defining a series of spaced arcuate peripheral sectors around said discs, a plurality of spaced cable guide rollers extending transversely between opposed pairs of sectors and journaled thereon, said rollers spaced equi-distantly inward of the periphery of each sector, and a U shaped outwardly opening transversely extending receiver nested within each opposed pair of cutouts spanning and secured to said discs, opposing end walls of said receiver curved oppositely outward at their ends beyond the disc periphery and centrally notched to receive said cable.

2. In a trolley conveyor, a turnwheel adapted to receive a movable cable carrying a plurality of equally spaced load supporting means; said turnwheel consisting of a hub, a pair of spaced discs centrally receiving said hub, there being a plurality of transversely aligned spaced pairs of radial load support means receiving cutouts spaced apart along the outer peripheries of said discs respectively, the portions between the spaced apart cutouts defining a series of spaced arcuate peripheral sectors around said discs, a plurality of spaced cable guide rollers extending transversely between opposed pairs of sectors and journaled thereon, said rollers spaced equi-distantly inward of the periphery of each sector, and a load supporting means receiving guide roller adjacent the end cable guide rollers between each of said sectors, journaled between adjacent sectors, with a portion of said roller extending into one end of a cutout and outwardly beyond the periphery of said discs.

3. In a trolley conveyor, an index turn means rockably mounted on a support, adapted to receive a movable cable carrying a plurality of equally spaced load supporting conveyor assemblies; said turn means consisting of a hub, a pair of spaced sectors receiving said hub at their apices, there being a radial cutout in the outer periphery of each sector, a U-shaped outwardly opening transversely extending conveyor assembly receiver nested within said cutouts spanning and secured to said sectors, opposing end walls of said receiver curved oppositely outward at their ends beyond the sector peripheries and centrally notched to receive said cable, a plurality of spaced cable guide rollers extending transversely between said sectors and journaled thereon, said rollers spaced equidistantly inward of the periphery of each sector and arranged on opposite sides of said receiver, movement of a conveyor assembly while nested in said receiver imparting an arcuate movement to said sectors from a first position to a second position, and means returning said sectors to said first position on disengagement of said conveyor assembly from said receiver.

4. In the trolley conveyor of claim 3, said latter means including a stationary solenoid having a reciprocal armature swivelly joined at its outer end to said sectors.

5. In the trolley conveyor of claim 3, said latter means including a stationary solenoid having a reciprocal armature swivelly joined at its outer end to said sectors, a first switch means operatively engaged by said conveyor assembly as it is disengaged from said sectors to energize said solenoid returning said sectors to said first position, and second switch means operatively engaged by the succeeding conveyor assembly deenergizing said solenoid.

6. In the trolley conveyor of claim 3, said latter means including a coiled spring mounted on and at one end anchored to said support, its opposite end secured to said sectors.

References Cited in the file of this patent

UNITED STATES PATENTS

| | | |
|---|---|---|
| 618,642 | Clouser | Jan. 31, 1899 |
| 1,704,150 | Riley | Mar. 5, 1929 |
| 2,476,497 | Landahl | July 19, 1949 |
| 2,720,792 | Zebley | Oct. 18, 1955 |
| 2,934,200 | Fletcher et al. | Apr. 26, 1960 |